Jan. 11, 1949.                 L. R. SIMMONS                 2,459,098
                     WEIGHT TRANSFERRING VEHICLE
                      COUPLING OR HITCH STRUCTURE
                          Filed Jan. 15, 1944
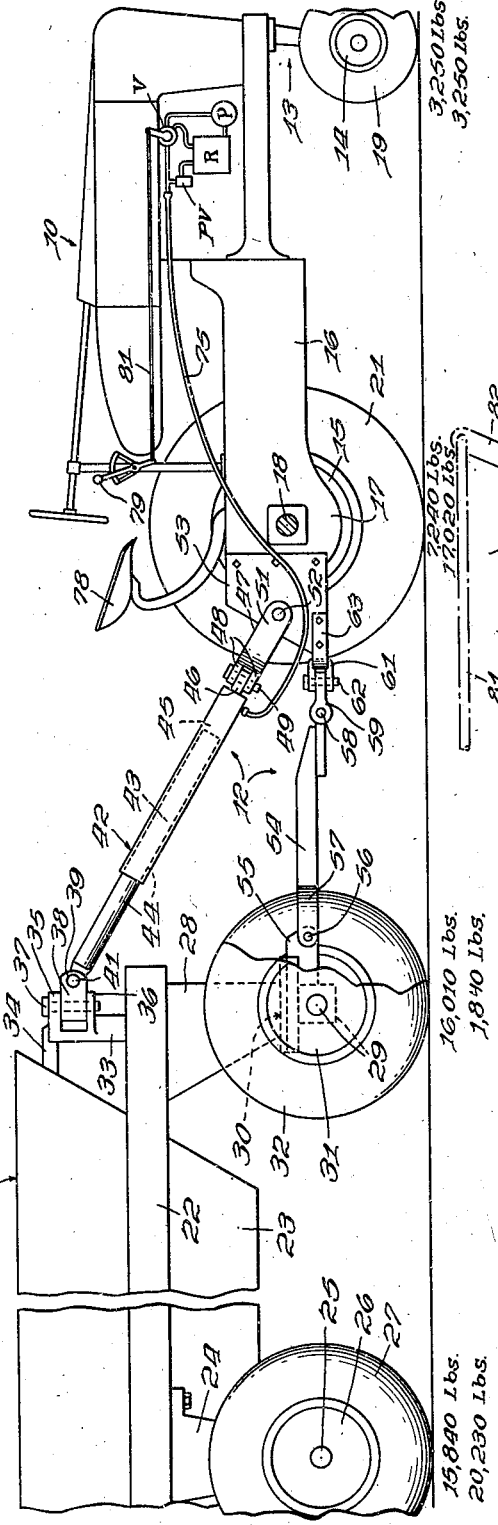
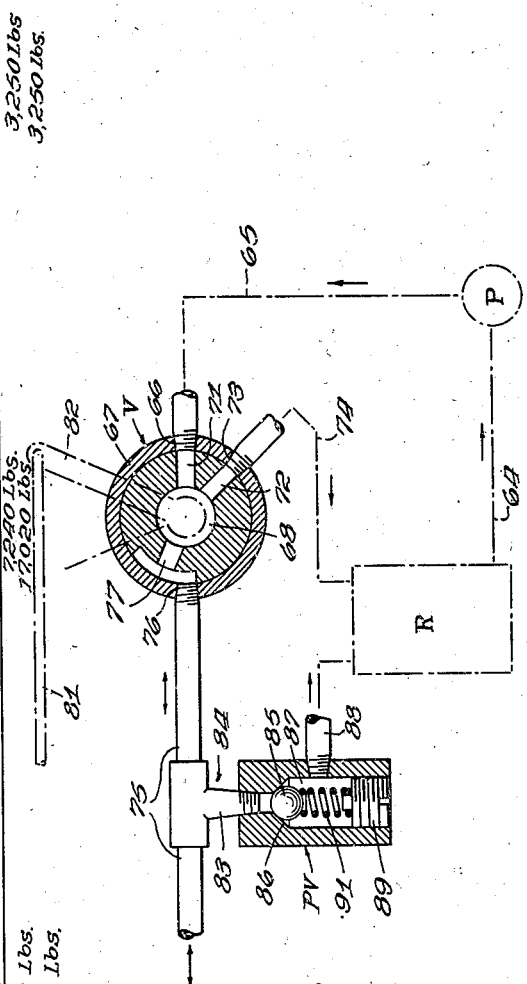
Inventor:
Lovel R. Simmons.

Patented Jan. 11, 1949

2,459,098

UNITED STATES PATENT OFFICE 2,459,098

WEIGHT-TRANSFERRING VEHICLE
COUPLING OR HITCH STRUCTURE

Lovel R. Simmons, Jackson, Miss.

Application January 15, 1944, Serial No. 518,336

1 Claim. (Cl. 280—33.44)

This invention relates to hitches operable between a propelling vehicle and a vehicle propelled thereby, for transferring traction-augmenting weight from the propelled to the propelling vehicle, and, more particularly, the invention concerns a fluid-energized hitch of this character and a source of energizing fluid controlled to cause said hitch to make adjustment for changes in relative elevations of the vehicles (and thereby diminish fluctuations in the transferred weight) while they are traversing an irregular course.

The advantages of a weight-transferring hitch between propelling and propelled vehicles are fully described in my copending application Serial No. 413,550, now Patent No. 2,382,449, dated August 14, 1945. In explaining the present invention it will suffice to refer to the paramount advantage of such a hitch, namely, the practical adaptation of a general purpose relatively lightweight traction vehicle for propelling a heavy normally self-supporting vehicle under conditions requiring increased traction weight on the traction vehicle for short infrequent periods at slow vehicular speed. Said hitch is operable at the will of an operator to temporarily transfer weight from the propelled normally self-supporting vehicle onto the propelling vehicle to improve its traction as when starting the propelled vehicle from rest or propelling it from a depression or over a hummock or up any steep incline. After the necessity for the transferred weight has passed, the hitch is relaxed to permit the propelled vehicle to support itself on its own front and back wheels.

When employing a traction vehicle in the aforesaid manner because of it being insufficiently rugged (and correspondingly less costly) to permanently carry part of the propelled vehicle, it is important to guard against sudden excessive load increases imposed onto the traction vehicle through the hitch structure while the latter is transferring weight. For instance, while the vehicles are traversing an irregular course with the hitch in weight-transferring operation, should the hitch be rigid and the tractor encounter a hummock or the propelled vehicle pass over the brink of a depression there would be a sudden enormous increase in the transferred weight, tantamount to a severe force impact, incurring destructive wrenching of the tractor. An object of this invention is to provide a hitch together with a control therefor which will prevent excessive increase in such traction force imposed on the tractor.

A further object is the provision of a weight-transferring hitch cooperable with a control to cause continued application of the traction force in virtually undiminished amount under circumstances as where the tractor should drop over the brink of a depression in the course of travel or where the propelled vehicle should rise onto a hummock. It follows therefore that the objects of this invention include the provision of an adjustable hitch and control cooperable to transmit a desired traction improving pressure from the propelled vehicle onto the tractor while preventing inordinate fluctuations in such pressure while the vehicles proceed over a rough uneven path.

A further object is the provision of a weight-transferring hitch having an expansible chamber of which the volume is correlated with adjustments of the hitch to accommodate changes in elevation of the vehicles, in combination with a supply of fluid inter-communicative with said chamber to inject fluid thereinto or receive fluid therefrom to facilitate the aforesaid adjustment of the hitch while causing it to transmit a desired amount of weight irrespective of the adjustment.

A further object is the provision, in a hitch and control as the above, of a control fluid source selectively conditionable to operate at will to energize the hitch for transferring weight or to relax the hitch so no weight is transferred.

Still a further object is the provision of a hitch and control according to the next preceding object, wherein the fluid source is regulatable to predetermine the pressure of fluid therein and consequently the amount of weight transferred when the source is operated, whereby the apparatus is capable of being set by a skilled person and used by one not necessarily skilled or trained. When apparatus of the present kind is used, the operator need only set a control member when encountering adverse traction conditions whereupon, so long as the control member remains set, the apparatus will automatically function to transfer the proper amount of weight in a manner absorbing shocks caused by unevenness of the course.

These and other objects encompassed by and inherent in the invention will be more readily understood from the ensuing description and the annexed drawings, wherein:

Fig. 1 is a side elevational view of a tractor and an earth hauling vehicle coupled thereto by a weight transferring coupling or hitch structure controlled in the amount of weight transferred thereby from the propelled vehicle onto the tractor by a fluid supply means or source constructed according to the principles of the present invention;

Fig. 2 is a view, partly diagrammatic, illustrating in cross section the valves employed in the fluid supply system and their connections with component parts of the fluid circulatory system.

With continued reference to the drawings, the tractor 10 is shown connected to an earth hauling vehicle 11 by a weight transferring hitch or coupling structure 12.

The tractor has the usual front steering truck 13 including steerable wheels 14 of which one is shown in the drawing. The tractor also has a pair of traction wheels 15 upon opposite sides of the tractor body 16 and of which wheels the one nearest the observer has been removed for better illustrating the connections of the hitch structure with the rear axle housing 17 of the tractor. The usual driving axles 18 extending oppositely within the rear axle housing are drivingly connected with the rear traction wheels. Inflated rubber tires 19 and 21 are respectively upon the front wheels and rear wheels of the tractor.

The propelled vehicle comprises a frame 22 which supports an earth hauling body 23 or the like. Pedestals 24 depend from the frame 22 at opposite sides of the body 23 for resting upon a rear axle 25 supported at opposite ends by wheels 26 provided with inflated rubber tires 27. At the front of the frame 22 there is a depending pedestal 28 having a suitable fifth wheel connection 30 with an intermediate portion of an axle 29 to permit pivotal movement of this axle about a vertical axis. Each end of the axle 29 carries a wheel 31 on which there is an inflated tire 32. A coupling pedestal 33 rigidly connected with the frame 22 projects upwardly therefrom and has a brace connection 34 with the vehicle body 23. This coupling pedestal 33 has vertically spaced apertured ears 35 and 36 for the reception of a pivot pin 37 having a collar 38 pivotably thereon. Spaced-apart apertured ears 39 projecting forwardly from the collar 38 receive a horizontally extending pivot pin 41 which connects the upper end of a distensible coupling device 42 therewith. This device consists of a hollow cylinder 43 closed at its lower end and open at its upper end and a piston-like plunger 44 projecting into the upper end of said cylinder. Thus the members 43 and 44 cooperate to form an expansible and contractible chamber 45 within the lower end of the cylinder 43.

A universally articulatable connection for connecting the lower end of the distensible device 42 with the tractor includes an apertured ear 46 on the lower end of the cylinder 43, a yoke 47 having apertured ears 48 straddling the ear 46, a pivot pin 49 connecting said ears, and diverging legs 51 (one being shown in Fig. 1) pivotally connected by pins 52 with respective laterally spaced plates 53 suitably attached to that portion of the rear axle housing which encloses the usual differential gear unit (not shown) through which the tractor axles 18 are driven. The pin 41 at the upper end of the distensible device 42, the collar 38 and the pin 37 provide a universally articulate connection for the upper end of this device with the coupling pedestal 33.

A drawbar 54 is connected to the front axle 29 of the propelled vehicle by means of laterally spaced projections 55 connected rigidly with such axle and horizontally disposed pivot pins 56 which extend through aligned holes in said projections and in laterally spaced arms 57 at the back end of the drawbar. The pivot pins 56 permit the drawbar 54 to pivot within a vertical plane while constraining said drawbar and the front axle 29 for unitary pivotal movement about the vertical pivot axis for said axle intersecting the support pedestal 28. Thus the pins 56 together with the pivotal connection of said axle 29 with the pedestal 28 provide a universally articulate connection between the drawbar and the propelled vehicle frame and enables the drawbar to impart steering movement to the front wheels 31 when swung horizontally while facilitating upward or downward swinging movement of the drawbar. A universally articulate connection is provided between the front end of the drawbar by a clevis pin 58, a clevis 59, a C-coupling member 61 and a vertical pivot pin 62 connecting said clevis with the coupling member 61. Strap means 63 is bolted to the coupling plates 53 for connecting the coupling member 61 with the tractor.

When it is desired to increase the traction of the tractor tires 21 this can be done by introducing fluid (preferably oil) into the chamber 45 of the distensible device 42 under sufficient pressure to distend the device by forcing the plunger 44 upwardly. Meanwhile the drawbar 54 prevents separation of the vehicles whereby an upward component of force is imparted to the coupling pedestal 33 by the plunger 44 in sufficient magnitude for lifting or partially lifting the front end of the propelled vehicle. Part of the weight thus relieved from the tires 32 of the propelled vehicle is transferred onto the rear tires 27 of such vehicle and part of the weight is transferred to the traction tires 21 of the tractor through the hitch or coupling structure 12.

When the device 42 is distended as aforesaid pivoting thereof is incurred about the pivot pins 41 and 52 at its upper and lower ends and pivoting of the drawbar 54 is incurred about the pivot pins 56 and 58 at its rear and forward ends. The pivot pins 37 and 49 in the universal joints at the upper and lower ends of the device 42 facilitate turning of the tractor relatively to the vehicle while swinging the device 42 laterally. A similar function is performed by the pivot pin 62 in the universal joint at the forward end of the drawbar 54 and the aforesaid vertical axis pivot for the propelled vehicle front axle 29. That is, the pivot pin 62 permits the tractor to turn relatively to the drawbar 54 and the aforesaid vertical axis pivot permits the tractor to swing the drawbar 54 for swinging the front wheels of the trailer for steering the same.

Typical weights supported by the various pairs of front and back tires upon the tractor and propelled vehicle are indicated by the numerical amounts written immediately below such tires. The uppermost amounts written below the tires indicate weights supported by the associated pair of tires when the hitch structure is relaxed, that is, when there is no fluid pressure within the chamber 45. The lowermost amounts written below the pairs of tires signify the typical weights supported thereby when fluid is injected into the chamber 45. In the example given it will be seen that the traction tires of the tractor carry only 7,240 pounds when the hitch or coupling structure is relaxed and that this weight is increased to 17,020 pounds when exigencies arise making it desirable to transfer weight from the propelled vehicle onto the tractor for increasing its traction. Normally the entire weight of the loaded propelled vehicle will be supported upon its own two pairs of front and back wheels, and even when weight is transferred by the hitch structure for increasing the traction of the tractor it is desirable that part of the weight of the propelled vehicle should remain upon its front tires to improve the stability of the vehicle. But even when leaving adequate weight upon the front tires of the propelled vehicle the weight transferable onto the tractor is immense and should be applied thereto evenly, that is, without sudden impact and only for relative short-duration emergency periods so as not to wrench the body of the tractor and strain or unduly shorten the life of the tractor tires. When the fluid pressure within the expansible chamber 45 of the hitch structure is properly controlled by apparatus now to be described said hitch structure can adjust itself while energized for transmitting a desired amount of weight onto the tractor so as not to inordinately fluctuate the amount of such transferred weight while the vehicles traverse an uneven course such as one having a series of depressions and/or hummocks. For instance, if the hitch structure were adjusted by a non-compressible fluid trapped in the chamber 45 so as to transfer a relatively large downward force onto the tractor while the hitch structure was thus made absolutely rigid in this adjusted position, and the rear wheels of the tractor should encounter a large hummock these wheels and the tractor body would suddenly rise with respect to the propelled vehicle and the hitch structure would necessarily greatly increase the weight transferred onto the tractor while perhaps raising the front wheels of the trailing vehicle completely off of the ground. This sudden increase of transferred weight onto the tractor would be at a speed at which the increased weight would be tantamount to a force impact. It is the purpose of the fluid control apparatus now to be described to avoid this kind of punishment to the tractor.

Referring again to the tractor there is shown mounted upon the side of its engine a pump P constantly driven from the engine. This pump may be a gear pump or any kind of positive delivery pump. Also upon the engine there is mounted a reservoir R for a quantity of the circulated fluid (preferably oil), a manually operated valve V and a pressure relief valve PV.

Normally the valve V will be in the position illustrated in Fig. 2 so that oil taken from the reservoir R by the pump through a conduit 64 and delivered from the pump through a conduit 65 into a port 66 in the casing 67 of such valve will reach a recess 68 in a rotor 69 of such valve through a passage 71. From the recess 68 the fluid returns to the reservoir R through a rotor passage 72, a casing port 73 and a conduit 74. Thus there is free circulation of the fluid by the pump at a low by-pass pressure. A hose or conduit 75 communicating at its rear end with the chamber 45 has a breather connection with the reservoir R through a casing port 76, valve rotor passage 77, valve rotor chamber 68, valve rotor passage 72, casing port 73 and the conduit 74 so that at this time the chamber 45 will be deflated and the hitch structure relaxed.

When it is desired to energize the hitch structure for transferring weight onto the tractor an operator upon the tractor seat 78 will push forwardly upon a lever 79 and thereby pull backwardly upon a link 81 and the upper end of a control arm 82 with which the valve rotor 69 is constrained for rotation. In this manner the valve member 69 is rotated counter-clockwise for moving the channel 71 out of registry with any of the casing ports while transferring the channel 72 into registry with the port 66 and leaving the channel 77 in communicative registry with the conduit 75. The by-pass condition of the fluid circuit will be thus terminated and the output from the pump will be directed through the conduit 65, port 66, channel 72, channel 77, port 76 and the conduit 75 into the hitch structure chamber 45. The pressure attained within the chamber 45 is determined by selectively setting the pressure relief valve PV. Upon the attainment of a certain pressure in the chamber 45 the fluid within the conduit 75 fed downwardly through the lower leg 83 of a T-coupling 84 will force a ball 85 from its seat 86, permitting the fluid to escape into the pressure relief valve chamber 87 and thence through a conduit 88 back into the reservoir.

The adjustment of the pressure relief valve PV is made preferably while the vehicles are at rest upon a level course and while the tractor engine is driving the pump at a speed corresponding to that at which the tractor engine will normally be driven under conditions requiring the tractor to transmit sufficient force to its traction wheels for propelling the loaded vehicle 11 under adverse conditions. This will be a fast engine speed. While the engine is running at this fast speed the control lever 79 will be pushed forwardly for adjusting the valve rotor 69 to the above described operated position in which its channel 72 is in registry with the port 66. A screw plug 89 in the lower end of the pressure relief valve casing will at this time be in a lowered position with the spring 91 exerting but a relatively small pressure upon the ball 85 so that this valve PV will permit the fluid to escape from the conduit 75 into the reservoir R without developing in said conduit and in the chamber 45 a sufficient pressure for materially urging the front end of the vehicle 11 upwardly. An operator having knowledge of the maximum amount of weight desired to be transferred onto the tractor from the vehicle 11 in an emergency requiring increased traction, will then screw the valve plug 89 upwardly and thereby correspondingly increase the resistance of fluid by-pass and the magnitude of fluid pressure within the chamber 45. When this fluid pressure reaches the magnitude which expands the chamber 45 to take a portion of the flex out of the front tires of the vehicle 11 incident to applying the desired maximum weight onto the tractor, the valve PV will be properly adjusted and will be left in that adjustment. Later when the vehicles are employed as upon a construction job where an inexperienced operator may be upon the tractor, this operator can when encountering conditions requiring additional traction, simply push forwardly upon the lever 79 and thereby introduce fluid into the hitch chamber 45 to energize the hitch structure whereby the predetermined amount of weight will be transferred onto the tractor. All during the emergency while additional traction force is being applied onto the tractor by the hitch structure the constantly driven pump P will be delivering fluid and the entire output of the pump will be passing through the valve PV back to the reservoir for re-circulation. Thus there is a constant supply of pressure fluid in pressure transferring relation with the expansible and contractible chamber 45 so that, for example, should the back wheels of the tractor drop into a shallow hole or depression fluid still at the desired pressure will be available and injected into the chamber 45 for maintaining the hitch structure energized for continued transfer of the desired amount of weight onto the tractor while the expansible device 42 is increased in length. Subsequently upon the traction wheels of the tractor advancing upwardly out of the depression the pressure relief valve PV will prevent an undesirable pressure surge in the chamber (and the attendant force impact onto the tractor) by permitting said chamber to contract incident to shortening of the expansible device 42.

Upon the rear wheels of the tractor encountering and passing over a hummock transfer of fluid between the chamber 45 and the fluid source including the reservoir and pump upon the tractor engine would again take place but in the reverse order as just described when the tractor wheels encounter a depression and subsequently rise out of the depression. In other words, the constant delivery fluid source disposed in fluid transfer relation with the expansible and contractible chamber 45 of the hitch structure is cooperable with such hitch structure to so couple the vehicles that a reasonably uniform traction-increasing force is imposable from the propelled vehicle onto the tractor while these vehicles traverse an uneven course causing changes in their relative elevation.

The hitch structure is inherently adjustable by the movement of the plunger 44 in the cylinder 43 for permitting relative changes in the elevation of the vehicles and when the hitch structure is energized by the introduction of fluid under pressure into the chamber 45 to obtain what may be regarded as a normal adjustment of the hitch structure incident to the transfer of a desired amount of force onto the tractor while the vehicles are upon a level course, the active source of fluid in fluid transfer relation with the chamber 45 is operable subsequent to the reception of fluid from the contracted chamber or subsequent to the injection of fluid into said chamber when it is expanded, to respectively inject fluid into said chamber and receive fluid from said chamber for reestablishing said normal adjustment upon the vehicles again encountering a level course.

Having thus described my invention with reference to the annexed drawings with the view of clearly illustrating the same, I claim:

An apparatus for coupling a tractor to a vehicle to be propelled thereby and self-supported upon a plurality of ground-engaging parts; the combination of a hitch structure adjustable to accommodate variation in the elevations of said tractor and vehicle while they traverse an uneven course, said structure including a chamber which expands and contracts attendant to such adjustment and which chamber is receivable of fluid under pressure to energize the structure for transferring weight from said vehicle onto the tractor in an amount constituting a function of the pressure of the fluid, and said hitch structure being universally articulately connected between said tractor and vehicle whereby stability of the vehicle with respect to tipping sidewise would be diminished if the hitch should lift the vehicle sufficiently to terminate contact of any ground-engaging part thereof with the ground; and fluid supply means for delivering energizing fluid into the chamber when it expands and for receiving fluid from said chamber when it contracts to modulate the pressure of fluid therein pursuant to adjustments of said structure, said fluid supply means including a fluid reservoir, a constant delivery pump driven from the tractor to withdraw fluid from the reservoir, a conduit connecting said chamber with the pump outlet, pressure relief valve means connected between the pump outlet and the reservoir and also between said chamber and the reservoir, said pressure relief valve means being settable to limit the pressure of fluid delivered by the pump and contained in said chamber to a value insufficient to energize the structure for raising any of the ground-engaging parts of the vehicle from the ground, and a manually-controlled valve means selectively settable in an adjustment establishing concurrent communication of said chamber and of the pump with the reservoir independently of the pressure relief valve means and instantaneously settable in another adjustment reestablishing communication of the pump outlet and of said chamber with the reservoir only through the pressure relief valve means.

LOVEL R. SIMMONS.

REFERENCES CITED

The following references are of record in the file of this patent:

UNITED STATES PATENTS

| Number | Name | Date |
| --- | --- | --- |
| 1,320,485 | Maw et al. | Nov. 4, 1919 |
| 1,724,635 | Bath | Aug. 13, 1929 |
| 2,030,986 | Havill | Feb. 18, 1939 |
| 2,155,421 | Kenyon et al. | Apr. 25, 1939 |

FOREIGN PATENTS

| Number | Country | Date |
| --- | --- | --- |
| 164,468 | Germany | Oct. 28, 1905 |
| 253,568 | Great Britain | June 17, 1926 |
| 485,931 | Germany | Nov. 7, 1929 |
| 512,770 | Germany | Nov. 18, 1930 |
| 677,061 | France | Mar. 3, 1930 |